April 25, 1972   G. TANGORRA ET AL   3,658,999
PROCESS FOR MANUFACTURING REINFORCING STRUCTURES FOR USE
AS A BREAKER STRUCTURE OF PNEUMATIC TIRES
Filed March 4, 1970
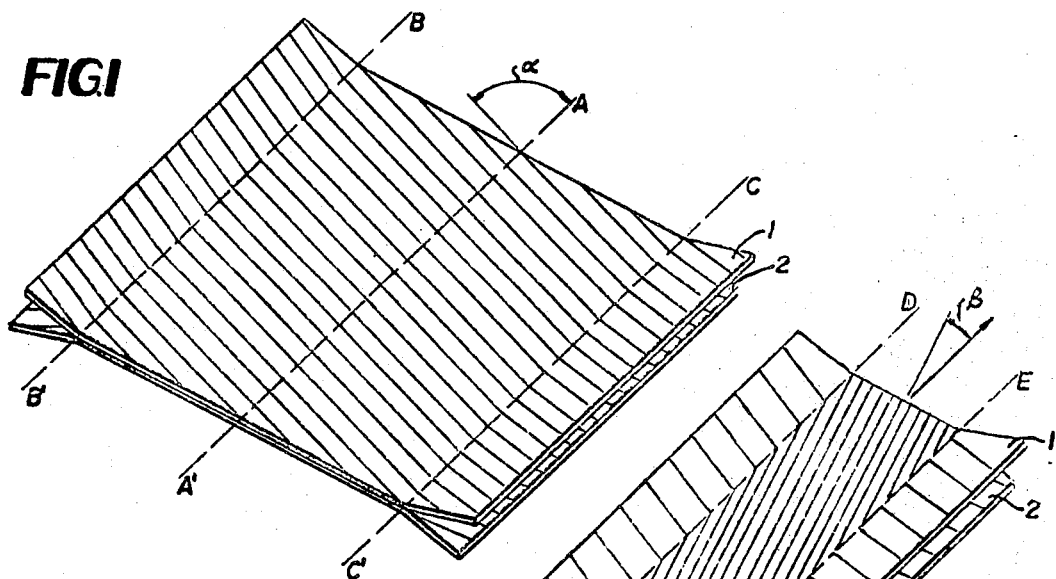
FIG.1
FIG.2
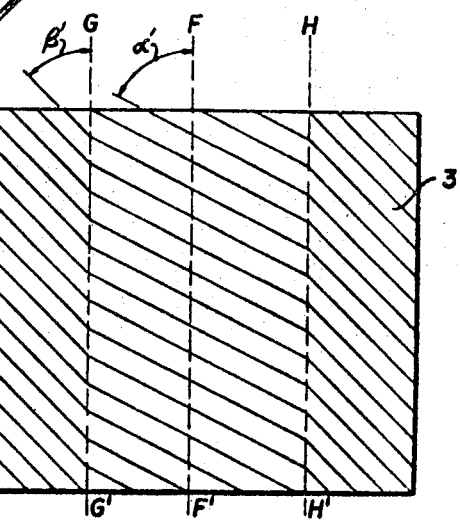
FIG.3
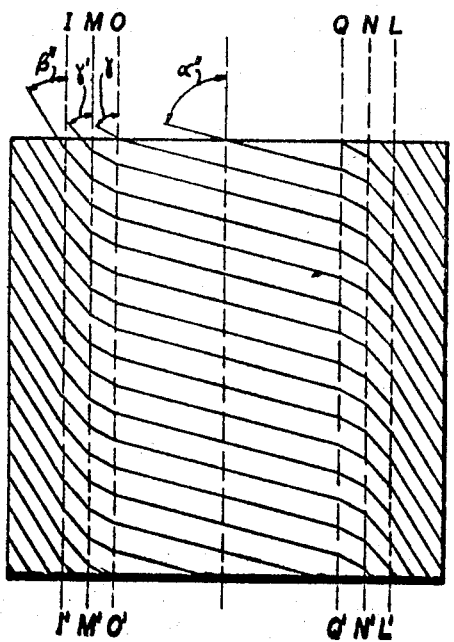
FIG.4

United States Patent Office 3,658,999
Patented Apr. 25, 1972

3,658,999
PROCESS FOR MANUFACTURING REINFORCING STRUCTURES FOR USE AS A BREAKER STRUCTURE OF PNEUMATIC TIRES
Giorgio Tangorra and Antonio di Giovinazzo, Milan, Italy, assignors to Industrie Pirelli S.p.A.
Filed Mar. 4, 1970, Ser. No. 16,386
Claims priority, application Italy, Mar. 6, 1969, 13,717/69
Int. Cl. B29h 17/10, 17/28
U.S. Cl. 156—133
10 Claims

ABSTRACT OF THE DISCLOSURE

A method of manufacturing a reinforcing structure adapted to provide a breaker structure for radial ply tires and which utilizes the step of building an assembly of at least two strips of cord fabric embedded in a vulcanizable rubber compound with the cords so arranged as to form an angle ranging between 75° and 25° relative to the mid-circumferential plane of the tire, the assembly being of a width generally corresponding to the width and development of the breaker structure. The strips are caused to firmly adhere to each other in a zone of the breaker structure extending the entire length and a portion of the width of the assembly. A separating element which can be eliminated in a further working step is interposed between the strips in a zone extending the entire length and a part of the width of the assembly. The assembly is then stretched lengthwise to a point of elongation ranging from 20% to 200% of its original length. The separating element is eliminated at least partially after the stretching step has been performed, at least partially. The resultant structure is then allowed to set, after which it is applied to the tire carcass which previously has been shaped into toroidal form.

The present invention relates to a process for the manufacture of reinforcing structures having a plurality of strips of cord fabric embedded in a vulcanizable rubber compound for use in pneumatic tires. More specifically, the invention relates to a process for producing reinforcing structures to serve as a breaker structure in which the component strips have their cords inclined at an angle variable along the path of the cords themselves in pre-established zones.

The background of the invention is such that the use of reinforcing structures for rubber articles having a plurality of strips of cord fabric of textile or metallic material and superimposed upon one another in such a way that the cords of each strip are arranged according to a prescribed inclination angle and are crossed with respect to the cords of the adjacent strip, is already known. It is also known that, irregardless of the materials used, the stiffness characteristics of such a reinforcing structure are affected by the inclination of the cords of the strips, such stiffness being greater in the direction in respect of which the cords form smaller angles.

The prior art structures are used as reinforcing elements for rubber articles, and the arrangement of the strips is appropriately chosen according to the stiffness characteristics desired. However, in the manufacture of some articles, such as pneumatic tires, belts, conveyors, elastic tapes and the like, it is often necessary to obtain a reinforcing structure which is particularly stiff in pre-determined zones and less stiff in others. In general, several structures, having different stiffness characteristics and arranged according to the needs, are provided for this purpose. This expedient, however, is not always satisfactory, in particular when such structures are to be disposed in contiguous relationship, since in the boundary portion between the different strips, the discontinuity of the cords makes the structure unable to withstand loads. This gives rise to solutions of continuity also in the reaction to the stresses, with a consequent prejudicial alteration of the performances of the reinforced article. This drawback is particularly prevalent in articles such as radial tires, the breaker structure of which—as it is known—is often composed of several contiguous and/or superimposed strips, wherein the cords are inclined, with respect to the mid-circumferential plane of the tire, at angles of different degrees from strip to strip, so as to have different stiffness characteristics both along the meridians and along the parallels of the tire itself.

In regard to the aforesaid problem, attempts have been made to obtain a differentiated stiffness of the breaker structure during the construction of the tire, utilizing the well known phenomenon by which, subjecting to stretching an assembly of strips of cord fabric, placed upon one another and firmly bonded together in such a way that the parallel cords of one strip are inclined with respect to the parallel cords of the others, it is possible to obtain in the zone of superimposition a variation of the orientation of the cords in each strip. The tension of the breaker strips is carried out in this case during the toroidal shaping of the carcass, on which the strips are superimposed, by means of an inflation treatment. The cords of each strip change their inclination particularly in the portion about the mid-circumferential plane of the tire, depending upon the tension of greater entity, while at the edges of the strips, the cords maintain their initial inclination almost unvaried. Also, the thickness of the cords changes in relation to the variation of their inclination, and it occurs much greater in the zone wherein the greatest angular reduction has taken place.

The above described method, however, is unsatisfactory because the stretching of the strips, obtained after the shaping operation, has a certain property, which at the most attains a value of the order of 60%, and occurs only in the mid-circumferential zone. It follows that the inclination angle of the cords can be reduced in a manner which cannot be varied according to the needs, and is limited to the above stated zone. Moreover, by means of this method, it is not possible to carry out a complete control on the variation of the path of the cords in the strips to ensure that said variation takes place in a constant and exact way in the zone where the rigidity of the structure is modified.

The present invention aims at obtaining a reinforcing structure, intended as a breaker structure for radial tires, in which the cords of its superimposed strips are inclined relative to each other at an angle of inclination variable within a wide range of values along the path of the cords themselves, in pre-established zones, and thus eliminating the above described problems.

Briefly summarized, the present invention is accordingly a process for the manufacture of a reinforcing structure to serve as the breaker structure of radial ply tires in which the breaker structure includes at least two strips of superimposed cord fabric, the cords of which are disposed with respect to the mid-circumferential plane of the tire by inclination angles varying from an upper range of 75° to 25° to a lower range of 40° to 10° along the path of the cords themselves in pre-established zones. This process includes the steps of building up an assembly comprising at least two strips of cord fabric covered with a vulcanizable rubber compound and so arranged that their cords are inclined, with respect to the mid-circumferential plane, by an angle ranging between 75° and 25°. Such assembly is provided with a width and a length depending respectively upon the width and the development of the breaker structure. The strips are caused to firmly adhere to one another at least in a zone extending the entire length, and a portion of the width, of the assembly. Between one strip and the other, there is interposed in at least another zone extending the entire length and part of the width of the assembly, a separating element which can be eliminated in a subsequent working step. Next, the assembly is subjected to a stretching in the direction of its length to an elongation equal to a value ranging from 20% to 200% of its initial length; then the separating element is at least partially eliminated and the stretching is carried out at least partially. Finally, the resultant is allowed to set and it is applied to the tire carcass previously shaped in toroidal form.

The assembly prepared according to the present invention may comprise two or more strips. When those strips have been arranged with their cords inclined and crossed relative to one another symmetrically, for example, at an angle within the above defined interval, the strips are caused to adhere to one another in the zone wherein it is desired to obtain a reduction in the inclination of their cords. Such zone, according to the needs, can be the central zone corresponding to the top portion of the tire or, vice versa, the zone along the edges of the assembly, corresponding in the tire to the zone at the edges of the breaker structure.

Correspondingly, in the other zones in which it is not necessary to modify the inclination of the cords, a separating element is interposed between one strip and the other, which may be a sheet of thermoplastic material or a layer of talc or wax or of any other material adapted to prevent the strips from coming into contact in the pre-established zones.

Following the stretching operation, the separating element is eliminated. If it is a sheet of thermoplastic material, this can be carried out by hand. However, if it is a talc or wax, its removal is respectively effected by covering the zones covered by it with a solvent, or by a simple heat treatment.

The separating element can also be partially removed from the zone where it is applied after having carried out the stretching of the assembly partially. Accordingly, when said stretching is continued, it is possible to obtain a structure in which there is a greater number of angles of inclination of the cords, and therefore a greater number of zones of different stiffness.

The setting of the obtained structure can be obtained by simply wrapping the latter with a service ply, and by storing it for a time sufficient to obtain the release of the materials.

If the structure is to be used immediately, its setting can be carried out by subjecting it to a heat treatment for a prescribed time, without using the treatment to such an extent as to cause complete curing of the assembly (which would prevent the adhesion of the latter to the tire carcass, already shaped in toroidal form, on which it is applied after its setting).

Obviously, the initial dimensions of the assembly are respectively chosen in accordance with the width and the development of the breaker structure, taking also into account the elongation of the assembly that will take place during the stretching operation to obtain the pre-established angle of inclination of the cords.

By means of the process according to the present invention, it is possible to positively control the variations of the inclination of the cords of the individual strips during the preparation of the reinforcing structure, and to achieve any desired path of the cords in well stated zones and at well stated angles. The manufacture of a semi-finished product as described permits the production of radial tires provided with a breaker structure having a differentiated stiffness of a simple construction.

The invention will now be better illustrated with reference to the accompanying drawings, given by way of example only, in which:

FIG. 1 is a perspective view of an assembly as it is prepared in the first steps of the process according to the invention;

FIG. 2 is a perspective view of the assembly of FIG. 1 after it has been stretched;

FIG. 3 is a plan view of another assembly according to the invention after a stretching operation has been performed; and FIG. 4 is a plan view of an assembly produced after several partial stretching operations.

In particular, FIG. 1 illustrates an assembly of strips 1 and 2 of cord fabric covered with a vulcanizable rubber compound. The strips are superimposed and so arranged that their respective cords are skew and symmetrically inclined, with respect to the median plane A–A' (corresponding to the longitudinal plane of the tire), at an angle $\alpha$ equal to about 70.

The strips are firmly bonded in the zone comprised between two planes represented by the dotted lines B–B' and C–C'. But, they are separated from each other in the other two zones, corresponding to the edges of the assembly, by means of a separating element (not illustrated for simplicity's sake).

FIG. 2 shows the assembly of FIG. 1 after it has been subjected to stretching to an elongation equal to 170% of its initial length. It should be noted, the cords of strip 1 are now inclined at an angle $\beta$ of 20° in the zone comprised between the planes D–D' and E–E'. The same variation occurs in the cords of strip 2, which become inclined at an angle equal to but opposite in sign to that of the cords of the strip 1 in the adhesion zone. However, in the edge zones, where the presence of the separating element has prevented variation of the inclination of the cords, the latter are arranged at an angle equal to its initial value, and with a thickness less than their initial thickness.

Obviously, a reduction in the initial width of the strips takes place during the stretching operation as a result of the narrowing of the adhesion zone between the two strips, and a corresponding elongation takes place in this zone in the direction of stretching.

FIG. 3 illustrates in plan view a modification of the invention, as it is obtained after the stretching operation. This assembly embodies two strips of cord fabric, only one of which (strip 3) is visible, and differs from that shown in FIG. 2 since the strips, in which the cords were originally inclined symmetrically, with respect to the median plane F–F' (corresponding to the longitudinal plane of the tire), at an angle $\alpha'$ equal to 65°, after having been caused to firmly adhere to one another in the zones corresponding to the edges of the assembly. Such strips, however, have been separated in the zones comprised between the two planes represented by the dotted lines G–G' and H–H' by means of a separating element. After the stretching of the assembly, carried out in such a way as to attain an elongation equal to 70% of its initial length, the cords of the strip 3 are inclined at an angle $\beta'$ of 45° in the zones corresponding to the edges of the assembly. The same modification takes place in the cords of the other strip, underlying the strip 3, these cords being inclined at an angle equal to that of the cords of the strips 3 in the adhesion zone, but of an opposite value.

FIG. 4 illustrates in plan view an assembly as it is obtained after several partial stretching operations. Two strips, the cords of which are symmetrically inclined at an angle $\alpha''$ equal to 72°, are superimposed and caused to firmly adhere to each other in their edge portions while they are separated by means of a separating element in the median zone disposed between the planes I–I' and L–L'.

After partial stretching to an elongation equal to 62% of the initial length and an initial variation of the inclination of the cords in the edge zones has been obtained, a part of the separating element is eliminated and the two strips are caused to adhere in the zones comprised between the planes I–I' and M–M' and the planes L–L' and N–N', respectively. Then, the assembly is again subjected to tension and this operation is interrupted after having obtained an elongation equal to 128% of the initial length. Subsequently, the separating element is partially eliminated in the zones comprised between the planes M–M' and O–O' and the planes N–N' and Q–Q', respectively, and the stretching operation is continued, after causing adhesion of the strips in the zones devoid of the separating element. The stretching operation is finally stopped after reaching an elongation equal to 165% of the initial length. Accordingly, the cords of the strips are inclined, at the edges of the assembly, at an angle $\beta''$ equal to 35°, while between the planes I–I' and M–M' and between the planes L–L' and N–N' they are inclined at a angle $\gamma$ equal to 45°, and between the planes M–M' and O–O' and between the planes N–N' and Q–Q' they are inclined at an angle $\gamma'$, equal to 60°. In the median zone disposed between the dotted lines representing the planes O–O' and Q–Q', the cords have the same inclination they had before the strips were subjected to stretching. The thickness of the cords varies according to the variation of their inclination, being greater at the edges than in the median zone, where the greatest thinning has taken place.

Although in the preceding description the reinforcing structure obtained according to the process of the present invention has been indicated as particularly suitable to be used as breaker structure of radial tires, it can advantageously be used as reinforcing structure for pneumatic tires in general, conveyor belts, belts, elastic tapes, and for all the rubber articles for which a differentiated stiffness of the reinforcement is desired, in pre-established zones, to ensure an improved performance. In articles of this kind, the reinforcing structure obtained as described is used, as it may be made for radial tires, by applying it to a vulcanizable or any other cross-linkable body of the articles.

It should be understood that the scope of the present invention is not limited precisely to the foregoing detailed description, but that it includes every embodiment deriving from the related inventive concept.

What is claimed as new is:

1. A process for the manufacture of a reinforcing structure intended to serve as the breaker structure of pneumatic tires having a radial carcass, said breaker structure having at least two strips of superimposed cord fabric, the cords of which are inclined with respect to the mid-circumferential plane of the tire by angles of inclination varying from an upper range of 75° to 25° to a lower range of 40° to 10° along the path of the cords in pre-established zones, characterized in that it comprises the steps of building up an assembly comprising at least two strips of cord fabric covered with a vulcanizable rubber compound and so arranged that their cords are inclined with respect to the mid-circumferential plane at an angle ranging between 75° and 25°, said assembly being of a width and a length corresponding to the desired width and the development of the breaker structure; causing said strips to firmly adhere to one another at least in a zone extending the entire length, and a part of the width, of the assembly; interposing between one strip and the other, in at least another zone extending for the entire length and a part of the width of the assembly, a separating element which can be eliminated in the subsequent working steps, subjecting the assembly to a lengthwise stretching to obtain an elongation equal to a value ranging from 20% to 200% of its initial length; eliminating at least partially said separating element after having carried out, at least partially, said stretching; allowing the resultant structure to set, and applying it on the tire carcass previously shaped in toroidal form.

2. A process as in claim 1, characterized in that said stretching operation is carried out in two or more steps, the separating element being eliminated, between one step and the other, at least in a zone extending for the entire length and a part of the width, of said assembly.

3. A process as in claim 1, in which the separating element is a sheet of thermoplastic material, and characterized in that said separating element is removed by hand.

4. A process as in claim 1, in which the separating element is a layer of talc, and characterized in that said element is removed by spreading with a solvent the zone whereon it is applied.

5. A process as in claim 1, in which the separating element is a layer of wax, and characterized in that said element is removed by a heat treatment of the structure.

6. A process as in claim 1, in which the setting operation includes wrapping the resultant structure with a service ply and storing the assembly for a time sufficient to obtain the release of the materials.

7. A process as in claim 1, characterized in that the setting operation includes subjecting the resultant structure to a heat treatment.

8. A method of manufacturing a reinforcing structure adapted for use as the breaker structure of radial ply tires comprising the steps of building an assembly having at least two strips of cord fabric covered with a vulcanizable compound which assembly is of a length and width corresponding to the desired breaker structure and the cords thereof are inclined at a prescribed angle relative to the mid-circumferential plane of the tire; causing the strips to adhere to each other in a zone of the assembly which extends the length of and a portion of the width thereof; interposing a separating element between said strips, said element being adapted for removal in a subsequent step; stretching the assembly beyond its initial length within a prescribed range; removing the separating element at least partially as the stretching step is being carried out; allowing the resultant structure to set; and applying said structure to a pre-shaped tire carcass.

9. The method as in claim 8 wherein said cords are inclined relative to the mid-circumferential plane at an angle ranging from 75° to 25°.

10. The method of claim 8 wherein the range of elongation in the stretching step is from 20% to 200% of the initial length of said assembly.

References Cited

UNITED STATES PATENTS 3,373,066   3/1968   Hindin _____ 156—128

BENJAMIN A. BORCHELT, Primary Examiner

S. C. BENTLEY, Assistant Examiner

U.S. Cl. X.R.

156—289, 323